United States Patent [19]

Teichler et al.

[11] Patent Number: 4,846,735

[45] Date of Patent: Jul. 11, 1989

[54] TELECOMMUNICATION TERMINAL STRIP

[75] Inventors: Heide Teichler; Manfred Muller, both of Berlin, Fed. Rep. of Germany

[73] Assignee: Krone Aktiengesellschaft, Fed. Rep. of Germany

[21] Appl. No.: 229,691

[22] Filed: Aug. 8, 1988

[30] Foreign Application Priority Data

Aug. 7, 1987 [DE] Fed. Rep. of Germany ....... 3726741

[51] Int. Cl.[4] .............................................. H01R 9/22
[52] U.S. Cl. .................................... 439/709; 439/719; 439/922; 361/119
[58] Field of Search ................................ 439/709–712, 439/715, 716, 718, 719, 723, 724, 922, 402, 403; 361/119

[56] References Cited

U.S. PATENT DOCUMENTS

| | | | |
|---|---|---|---|
| 1,023,326 | 4/1912 | Murray | 439/709 |
| 4,066,317 | 1/1978 | Bierenfeld et al. | 439/403 |
| 4,651,340 | 3/1987 | Marson | 439/716 |
| 4,669,799 | 6/1987 | Vachhani et al. | 439/719 |
| 4,688,865 | 8/1987 | Kelly | 439/922 |

FOREIGN PATENT DOCUMENTS

| | | |
|---|---|---|
| 2804478 | 11/1982 | Fed. Rep. of Germany . |
| 2811812 | 12/1984 | Fed. Rep. of Germany . |
| 2013423 | 12/1982 | United Kingdom . |

Primary Examiner—Neil Abrams
Assistant Examiner—Khiem Nguyen
Attorney, Agent, or Firm—McGlew & Tuttle

[57] ABSTRACT

The invention relates to a terminal strip or blocks in telecommunications, comprising a support plate with terminal elements for conductors to be plugged thereon and of a strip-like upper part to be snapped onto the support plate to create a relatively long terminal block without risk of addition of tolerance errors. The upper part is formed by several partial blocks, and the support plate has several receiving chambers arranged one behind the other for the partial blocks.

6 Claims, 3 Drawing Sheets

TELECOMMUNICATION TERMINAL STRIP

BACKGROUND OF THE INVENTION

1. Field of the Invention

This invention relates in general to telecommunications devices and in particular to a new and useful telecommunication terminal strip.

A similar terminal block is known from DE-PS 28 04 478. It comprises a support plate and of an upper part to be snapped onto the support plate. The support plate and upper part are made of plastic. Insertable into the support plate are several terminal elements, each with two cutting/clamping contacts which protrude into the upper part. The upper part has on the top side of its housing several clamping elements with slot type openings therebetween. The cutting/clamping contacts each include two leaf-like resilient contact legs, between which a contact slit is formed. The upwardly open contact slit of the cutting/clamping contact embedded in the terminal strip is accessible from above, due to the slot-like opening of the upper part. As very narrow tolerances must be maintained between the support plate and the snap-on upper part, only short terminal strips can be manufactured at reasonable manufacturing cost, since for greater lengths deviations, if any, will add up. Moreover, very long upper parts for the terminal strips have very high manufacturing costs because of the needed large injection molding dies.

According to DE-PS 28 11 812, therefore, short terminal strips with ten double-conductor terminals (10DA) are secured on a mounting yoke.

SUMMARY OF THE INVENTION

The invention provides a terminal strip which has a greater length and therefore can take up more than 10 DA without risk of addition of tolerance errors and without raising the manufacturing cost. According to the invention, the tolerance values of a relatively long terminal strip are referred only to a partial strip. To advantage the terminal strip can be manufactured industrially in a cost-efficient manner because only small injection molding dies are needed for the manufacture of the partial strip. Thus, i.e., also two rows of partial strips can be arranged side by side on a support plate, a common grounding bar being provided for a grounding terminal.

Accordingly, it is an object of the invention to provide a terminal strip for telecommunications which comprises a support plate with the pluggable terminal receding elements for conductors which may be plugged into the receiving elements and which includes a strip type upper part which is snapped onto the support plate and which is formed of several partial strips and wherein the support plate has several successively arranged chambers for receiving the partial strips. A further object of the invention is to provide a terminal strip which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DESCRIPTION OF THE PREFERRED EMBODIMENTS

Figure 1:
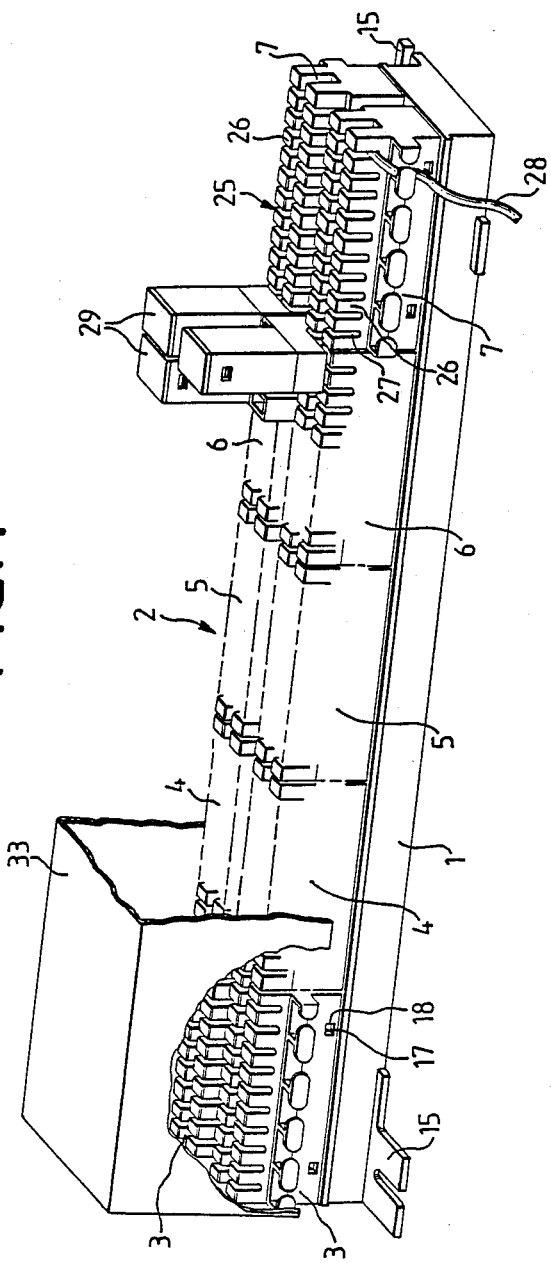
FIG. 1 is a perspective view of a terminal strip constructed in accordance with the invention.

Referring to the drawings in particular the invention embodied therein comprises a terminal strip with telecommunications which comprises a support plate 1, having a plurality of pluggable terminal receiving elements for conductors 28 which are arranged to be plugged thereon which includes an upper block part 2 which may be snapped onto the support plate. The upper part is formed of several partial blocks or strips designated 3, 4, 5, 6 and 7 which correspond to successively arranged chambers 8, 9, 10, 11 and formed in the support plate for receiving the partial strips.

The terminal block comprises a rectangular support plate 1 and several identically formed partial strips or blocks 3 to 7 which are secured successively in two rows on the support plate 1. The support plate 1 and partial strips or blocks 3 to 7 are made of plastic. The design of the partial blocks 3 to 7 is identical with that of the upper parts according to DE-PS 28 04 478.

Figure 3:
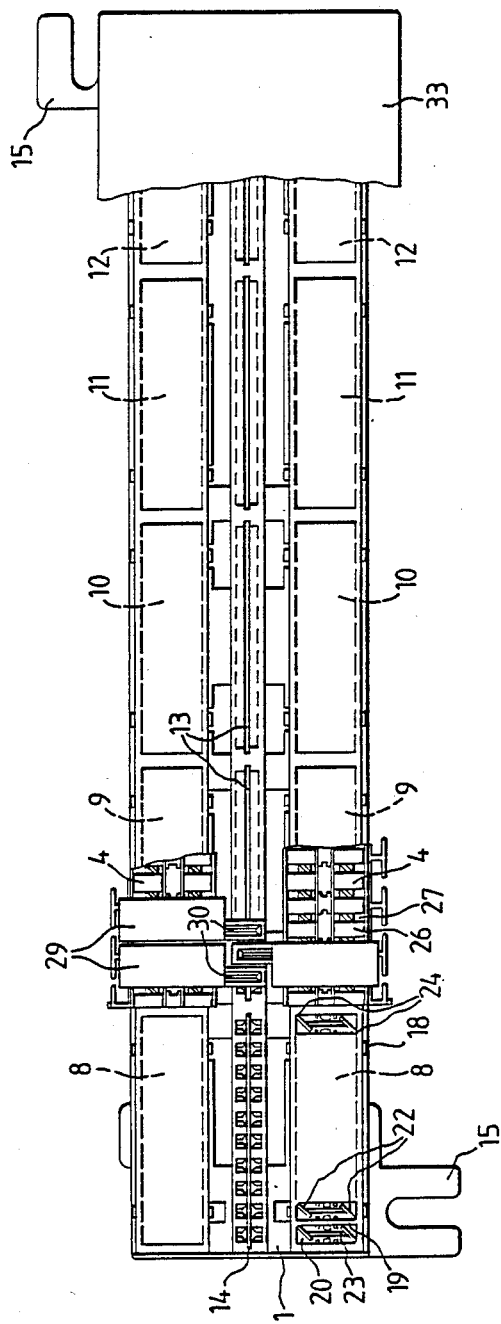
FIG. 3 is a top view of the support plate of the terminal strip with partial representation of two partial strips.

The support plate 1 has several chambers 8 to 12 arranged in two rows one behind the other for receiving the respective blocks 3 to 7. The chambers 8 to 12 are formed by chamber walls 16. In each chamber 8 to 12 several cross walls 19 are provided, which divide the chambers 8 to 12 into several individual partial chambers 20 for receiving terminal elements 23. In diagonally opposite corners of each partial chamber 20 two slots 24 for cutting/clamping contacts 22 are cut. The terminal elements 23, each having two cutting/clamping contacts 22 at an angle of 45° to the transverse axis, are inserted upright in the partial chambers 20, and in each instance a contact leg 21 of both cutting/clamping contacts 22 of a terminal element 23 is held clamped in the slot 24. In the ten partial chambers 20 of a chamber 8 to 12, therefore, ten terminal elements 23 for five double conductors are received. FIG. 3 shows in the left chamber 8 three partial chambers 20. In that respect the chambers 8 to 12 are identical in design with the sub-parts according to DE-PS 28 04 478.

Slipped onto the upright terminal elements 23 of a chamber 8 to 12 is a partial strip block 3 to 7. Also in the housing interior of the partial strips 3 to 7 there are provided several partial chambers 20' separated by cross walls 19 and having receiving slot 24'. Four detent segments 18 on the outside of the outer wall 16 of the receiving chambers 8 to 12 snap into detent depressions 17 of the wall of the partial strips 3 to 7.

Five partial strips or blocks 3 to 7 each with five double conductor terminals, are secured in each of the two rows one behind the other on the support plate 1. This arrangement provides for the formation of the terminal block, which thus comprises a total of 50 double conductor terminals.

On the top side 25 of partial blocks 3 to 7, clamping elements 26 with clamping slots 27 lying therebetween for the conductors 28 are provided. Through the clamping slot 27 an upwardly open contact slot 41 of the cutting/clamping contact 22 is accessible from above in each instance. To connect an insulated conductor 28 to the terminal element 23, the conductor 28 is first placed into the clamping slot 27 and then pressed with the aid of a tool (not shown) into the contact slot 41 of the cutting/clamping contact 22, with the sharp edges of the 45° contact legs 21 piercing first the insulation and then penetrating into the conducting core of the conductor 28. The terminal elements 23 possess in the center either a tap 38 or an insulating contact 40, FIG. 2.

Figure 2:
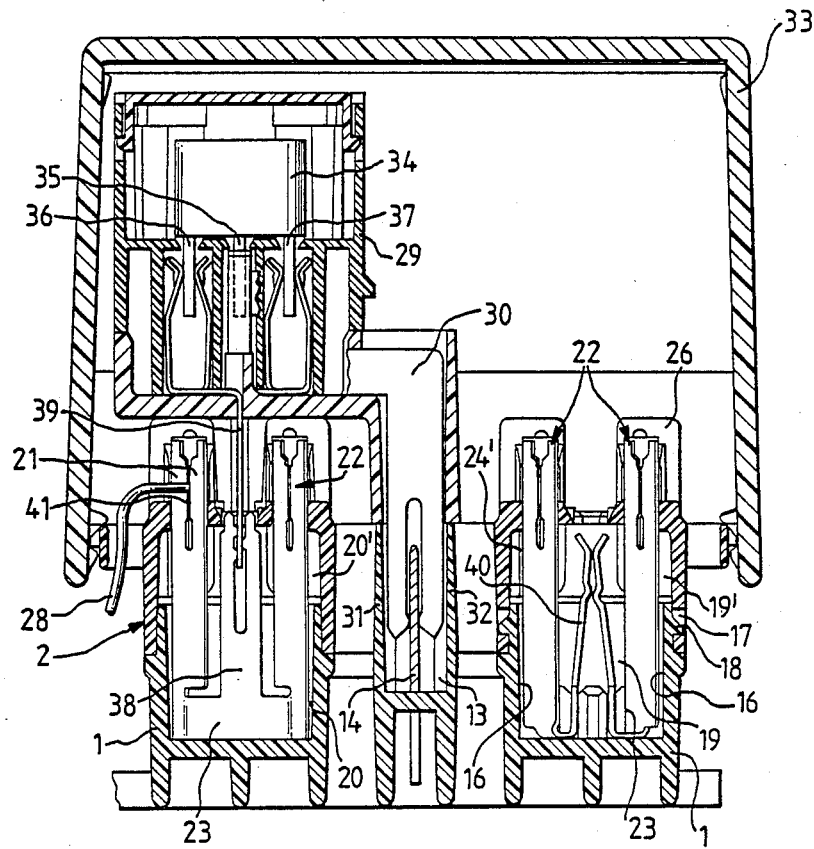
FIG. 2 is a transverse section through the terminal strip.

As shown in FIGS. 1 and 2, two rows of the partial blocks 3 to 7 are mounted parallel to each other on the support plate 1. Between the two rows, there is provided in the support plate 1 a groove 13 running parallel to the rows, in which groove a metallic grounding bar 14 is inserted. On either side of plastic walls 31, 32 limiting the groove 13, the grounding bar 14 is mounted in the support plate 1 protected from contact. The grounding bar 14 is connected with a ground potential not illustrated and serves as a ground tap for the overvoltage deflector plugs 29 pluggable into the partial strips 3 to 7, which plugs have for this purpose a fork contact 30 which is plugged onto the grounding bar 14. Inside the housing of each plug 29 there is arranged a 3-pole overvoltage deflector 34, the center contact 35 of which is connected with the fork contact 30, while its outer contacts 36, 37 are connected via contact tongues 39 with a central tap 38 of the terminal element 23. With the aid of a plug 29, the conductors 28 connected to two terminal elements 23 are switched to ground potential in case of over voltage.

For attachment of the terminal strip to a frame, in particular a distributing frame, attachment plates 15 for receiving attachment screws (not shown) are provided on the long sides of the support plate 1 at opposite ends.

For protection against dust, a cap 33 is secured over the terminal strip on the support plate 1.

The terminal strip may be equipped with terminal elements 23 with a tap 38 or as isolating strip with terminal elements 23 with an isolating contact 40, so that the terminal block can be used also as isolating block.

While specific embodiments of the invention have been shown and described in detail to illustrate the application of the principals of the invention, it will be understood that the invention may be embodied otherwise without departing from such principles.

What is claimed is:

1. A telecommunication terminal block comprising:
a terminal block support plate having walls defining a plurality of chambers, each chamber having cross walls defining a plurality of partial chambers;
a plurality of terminal elements positionable in each of said partial chambers, each terminal element cooperating with another terminal element to form a plurality of double conductor sets;
a plurality of partial upper blocks, each partial upper block being snap-fitted into engagement with walls defining one of said plurality of chambers of said terminal block, each of said partial blocks having terminal engagement means for engaging and supporting a plurality of said double conductor sets in cooperation with said terminal block support plate.

2. A telecommunications terminal block according to claim 1, comprising: a groove for receiving a metallic grounding bar formed in said support plate parallel to each of said chambers and said partial upper blocks, said chambers being arranged in two rows with said groove positioned therebetween.

3. A terminal block according to claim 1, wherein said chambers are arranged in two parallel rows including a groove formation between said rows for a grounding bar, a grounding bar being positioned between said rows of said chambers.

4. A terminal block according to claim 1, further comprising: attachment plates connected to said support plate for connecting said support plate to a distributing frame.

5. A terminal block according to claim 1, further comprising detent segments associated with said walls defining a plurality of chambers and cooperating detent depressions associated with each of said partial upper blocks, said detent segments and detent depressions cooperating to form a snap-fit connection.

6. A telecommunications terminal block according to claim 1, wherein each of said support plates includes ten chambers and each chamber includes ten partial chambers which provide five double conductors for each chamber.

* * * * *